June 6, 1961   H. W. G. HIGNETT ET AL   2,986,806
PRODUCTION OF TURBINE OR COMPRESSOR BLADES
Filed Jan. 20, 1958   2 Sheets-Sheet 1
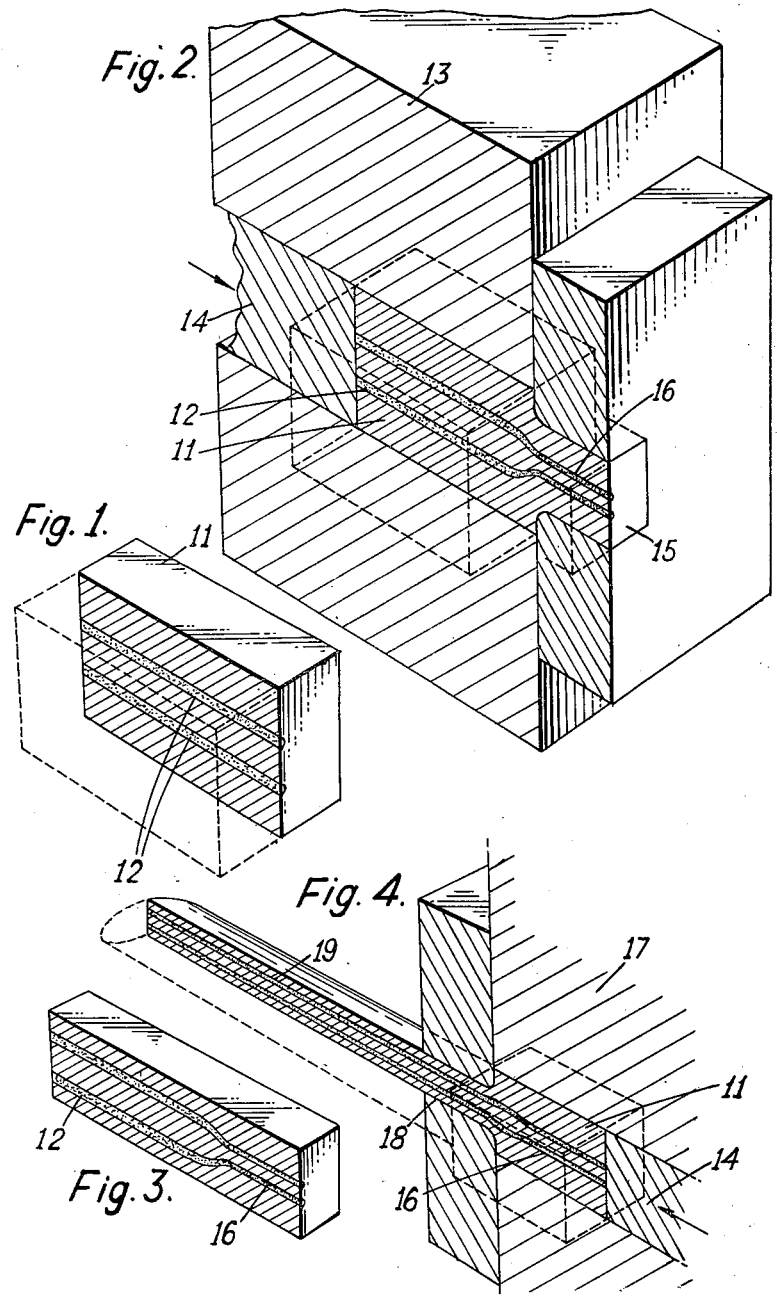
Inventors
HAROLD W.G. HIGNETT, PHILIP G. TURNER,
ALEXANDER B. GRAHAM and CAMPBELL C. HORNE
By
Attorney June 6, 1961   H. W. G. HIGNETT ET AL   2,986,806
PRODUCTION OF TURBINE OR COMPRESSOR BLADES
Filed Jan. 20, 1958   2 Sheets-Sheet 2
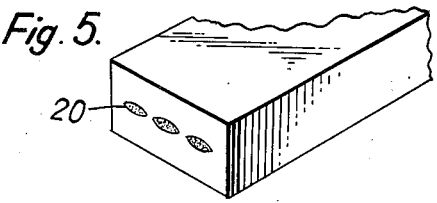
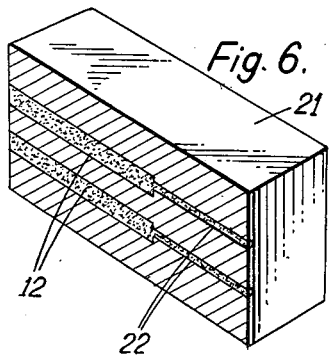
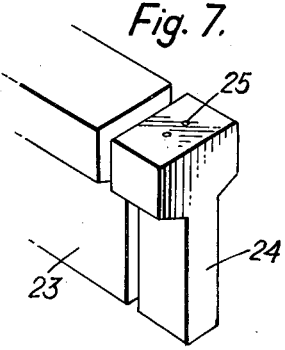
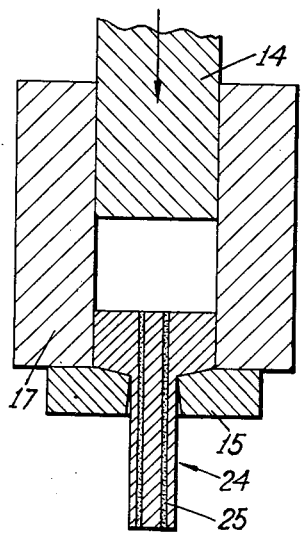
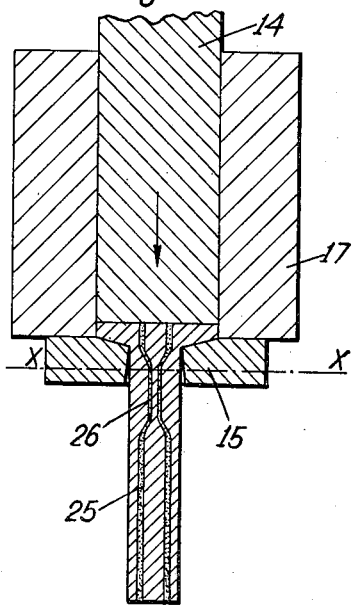
Inventors
HAROLD W.G. HIGNETT, PHILIP G. TURNER,
ALEXANDER B. GRAHAM and CAMPBELL C. HORNE

United States Patent Office 2,986,806
Patented June 6, 1961

2,986,806
PRODUCTION OF TURBINE OR COMPRESSOR BLADES

Harold W. G. Hignett, Harborne, Birmingham, and Philip G. Turner, Inkberrow, England, and Alexander B. Graham, Whitecraigs, Glasgow, and Campbell C. Horne, Giffnock, Scotland, assignors to The International Nickel Company, Inc., New York, N.Y., a corporation of Delaware
Filed Jan. 20, 1958, Ser. No. 710,046
Claims priority, application Great Britain Jan. 21, 1957
2 Claims. (Cl. 29—156.8)

The present invention relates to the production of fluid-cooled turbine blades and, more particularly, to the production of fluid-cooled turbine blades by hot deformation of special billets.

It is an object of the present invention to provide a novel process for the production of fluid-cooled turbine blades.

Other objects and advantages will become apparent from the following description taken in conjunction with the accompanying drawing in which:

FIGURE 1 shows a billet to be extruded in accordance with the invention;

FIG. 2 shows the first extrusion of the billet shown in FIGURE 1;

FIG. 3 shows the extruded billet after a machining step;

FIG. 4 shows the extrusion of said machined billet;

FIG. 5 shows another billet after an intermediate treatment and before extrusion in the manner shown in FIG. 2;

FIG. 6 shows a billet which may be extruded in accordance with the invention as shown in FIG. 4;

FIG. 7 shows the starting material in an alternative embodiment of the present invention; and FIGS. 8 and 9 show stages in the conversion of the material illustrated in FIG. 7 into a billet with holes varying in cross-sectional area which can be extruded in accordance with the invention.

Generally speaking, the present invention contemplates the production of turbine (or compressor) blades having cooling passages extending longitudinally therethrough. According to the invention, filled holes extending substantially longitudinally and of greater cross-sectional area over some of their length than over the remainder are made in a billet; then some or all of that part of the billet in which the holes are of greater cross-sectional area is deformed to substantially the cross-sectional shape required in the blade proper, the remainder of the billet with or without deformation or machining, forming the root.

The filled holes may be made in the billet in various ways. Thus, the billet may be drilled from one end to form holes of larger diameter over part of its length and thereafter a smaller drill may be used in these holes so as to extend them through some or all of the remaining length but with smaller diameter. Again, the billet may be drilled from opposite ends with drills of different sizes. In either case the holes are thereafter filled. Yet again, a piece of metal with holes drilled either blind or completely through it and filled may be deformed to produce the billet and to render the cross section of the holes no longer uniform along the axis.

When the filled holes described above have been made, the deformation to form the blade proper may be effected by partial extrusion with the holes of greater cross-sectional area leading or by rolling or by any other hot working operation to deform at least a portion of the holes of greater cross section.

If the blade is to have a shroud at its free end, the holes in the billet may be made blind at the end at which they are of larger cross-sectional area and after the deformation to form the blade proper the free end of the part forming the blade proper is further deformed to form the shroud.

A particularly convenient and advantageous method of carrying out the invention involves extrusion of a filled billet first in one direction and then in the other. This and another method will be more readily understood by reference to the accompanying drawings. Referring now thereto, in the method illustrated by FIGURES 1 to 4 a rectangular billet is drilled to form a number of parallel longitudinal holes 12. There may be, say, ten holes only two of which are shown and they all lie within a central area of the billet. The holes are filled and the billet is then extruded from a container 13 by a ram 14 through a rectangular die 15, the opening of which corresponds to the central area of the billet that contains the holes, as shown in FIG. 2. The extrusion is stopped while some of the billet remains in die 15. As a result, the holes 16 in the extruded part are elongated and reduced in cross section. The unextruded part of the billet is now machined to remove the metal outside the central area referred to above, so that the billet is now as shown in FIG. 3. The billet is next put in another extrusion container 17 and extruded by a ram 14 through a die 18 of roughly airfoil section with the holes 12 of larger cross section leading as shown in FIG. 4 and again the extrusion is stopped while some of the billet remains in the container of the press. The result is that the holes 12 are elongated and reduced in cross section to form blade holes 19 which are required in the blade proper, whereas the elongated holes 16 which are continuous with the elongated blade holes 19, lie within the part that forms the root and emerge through the base of the root. Moreover, the total cross-sectional areas of the two sets of continuous holes are substantially equal.

Before the billet shown in FIG. 1 is partially extruded, the holes in it may be converted to substantially elliptical shape in the manner described in the Turner and Horne U.S. application Serial No. 657,553, that is to say, the billet may be rolled to reduce one cross-sectional dimension while maintaining the other substantially unchanged so that the billet acquires the shape shown in FIG. 5 with substantially elliptical holes 20. Of course, the actual dimensions of the original billet or of the opening in the die 15 must together be appropriate for the production of the desired blade.

FIG. 6 shows a billet 21 having drilled holes 12 of larger diameter continuous with drilled holes 22 of smaller diameter, both sets of holes being filled with filler rods of appropriate size. The billet 21 is extruded with the holes 12 leading in the way illustrated by FIG. 4.

Another way of making the holes in the billet is illustrated by FIGS. 7 to 9. The starting material in this case is a bar 23 of T section from which a piece 24 is cut. Holes 25 are drilled in this piece and filled and the piece is then deformed to reduce some or all of the head of the T to the same cross-sectional size and shape as the leg. This may be done by extrusion from a press 17 by a ram 14 through a die 15 as shown in FIGS. 8 and 9. The product is the billet shown in FIG. 9 with the holes 26 in the part that was the head of the T elongated and reduced in cross section. This part forms the root of the final blade and the end of it may be cut off as required along the line X—X to provide a root of the desired size. The resultant billet is now partially extruded through an airfoil die such as that shown at 18 in FIG. 4 with the unaltered (and therefore larger) holes 25 leading.

The leg of the piece 24 may taper towards its free end with the result that after the final extrusion the holes in the blade proper taper from the tip of the blade to the forward edge of the root.

For the purpose of giving those skilled in the art a better understanding of the invention (and/or a better appreciation of the advantages of the invention), the following illustrative example is given:

Example

A billet (FIG. 1) of nickel-chromium alloy having a composition:

| | Percent |
|---|---|
| Carbon _____ max__ | 0.1 |
| Titanium _____ | 1.8–3.0 |
| Chromium _____ | 18–21 |
| Aluminium _____ | 0.8–2.0 |
| Silicon _____ max__ | 1.5 |
| Manganese _____ max__ | 1.0 |
| Iron _____ max__ | 5.0 |
| Cobalt _____ | 15–21 |
| Nickel _____ | Balance | is of parallelepiped form, section 2″ square, length 2¼″. Two cylindrical holes of 0.1″ diameter are drilled and spaced apart ½″. The holes are filled with filler rod of composition iron 88%, manganese 10%, titanium 2%. The billet is extruded at 1140°–1160° C. to give the form shown in FIG. 2. The extruded section having an area of 1″ x 2″, length ¼″. Holes in this portion now become ellipses having major axes 0.1″ and minor axes 0.05″ and are pitched apart ¼″. The extruded product of FIG. 2 is now machined to parallelepiped form shown in FIG 3, section 1″ x 2″, length 3″. The billet is then extruded as shown in FIG. 4 to aerofoil section of chord 2″ and maximum thickness ½″. The filled holes in the mid-chord are now approximately the same size and pitch as the filled holes in the root block. The filled holes are finally leached to clear the passageways for coolant. It should be appreciated that this technique is directed to the production of cooled turbine blades having a plurality of small passageways of lenticular section, that is to say a blade having a high Z factor. While this example refers to two cooling passages only this is done for the sake of simplicity and to agree with the illustrations.

With respect to the manufacture of turbine blades by means of the novel process, it should be understood that the term "heat-resistant metal" is used to include austenitic nickel-chromium alloys, including nickel-chromium-iron and nickel-chromium-cobalt and cobalt-chromium alloys, including cobalt-chromium-iron alloys, which contain a total of at least about 25% nickel plus chromium, cobalt plus chromium or nickel plus chromium plus cobalt (i.e., a total of at least about 25% of chromium plus nickel and/or cobalt), in addition to small amounts of aluminum, titanium, molybdenum, tungsten, niobium, tantalum, silicon, manganese, zirconium and boron which may optionally be present in the alloys. These alloys are adapted to be subjected in use to temperatures up to about 700° C. or above and, accordingly, must be hot worked at temperatures around 1200° C. Filler material used for providing filled holes in said heat-resistant metal billets are most advantageously ferritic manganese-titanium steels containing about 5% to about 20% manganese, about 1% to about 10% titanium, up to about 0.3% carbon with the balance essentially iron. These steel filler materials are described and claimed in the Betteridge U.S. application Serial No. 509,380, now Patent No. 2,891,307. Other advantageous filler materials are metal-ceramic mixtures having a continuous metal phase and containing about 5% to about 25% ceramic material, e.g., magnesia and the balance metal, e.g., iron. Such metal-ceramic fillers are described and claimed in the Hignett U.S. application Serial No. 472,755, now Patent No. 2,941,281.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for producing a turbine blade blank having a plurality of longitudinal holes of substantially uniform cross section extending through said blade, which comprises partially extruding in a longitudinal direction a metal billet, said billet having a plurality of filled, longitudinal holes of substantially uniform cross section extending therethrough and said holes being filled with a removable filler material having deformation characteristics similar to the deformation characteristics of the metal of said billet, to provide a product having filled holes of nonuniform cross section extending therethrough, said filled holes having a small cross-sectional area near one end thereof and a larger cross-sectional area near the other end thereof, partially extruding the product so formed in a longitudinal direction opposite the direction of the first partial extrusion through an airfoil section die for a distance approximately equal to the length of the original billet which was not extruded during the first operation to provide a turbine blade blank having filled holes of substantially uniform cross-sectional area extending therethrough and thereafter removing the filler from said turbine blade blank.

2. A process for producing a turbine blade blank having a plurality of longitudinal holes of substantially uniform cross section extending through said blade, which comprises partially extruding in a longitudinal direction a metal billet of substantially uniform cross section, said billet having a plurality of filled, longitudinal holes of substantially uniform cross section extending therethrough and said holes being filled with a removable filler material having deformation characteristics similar to the deformation characteristics of the metal of said billet, to provide a product having filled holes extending therethrough, said filled holes having a small cross-sectional area near one end thereof and a larger cross-sectional area near the other end thereof, machining said product to substantially uniform cross section, partially extruding said product having a substantially uniform cross section in a longitudinal direction opposite the direction of the first partial extrusion through an airfoil section die for a distance approximately equal to the length of the original billet which was not extruded during the first operation to provide a turbine blade blank having filled holes of substantially uniform cross-sectional area extending therethrough and thereafter removing the filler from said turbine blade blank.

References Cited in the file of this patent

UNITED STATES PATENTS

| 2,013,622 | Bedford et al. | Sept. 3, 1935 |
| 2,628,417 | Peyches | Feb. 17, 1953 |

FOREIGN PATENTS

| 755,610 | Great Britain | Aug. 22, 1956 |

UNITED STATES PATENT OFFICE
CERTIFICATE OF CORRECTION

Patent No. 2,986,806            June 6, 1961

Harold W. G. Hignett et al.

It is hereby certified that error appears in the above numbered patent requiring correction and that the said Letters Patent should read as corrected below.

Column 2, line 10, after "billet" insert -- 11 --; column 3, line 25, for "¼"" read -- 1-¼" --.

Signed and sealed this 26th day of September 1961.

(SEAL)
Attest:

ERNEST W. SWIDER
Attesting Officer

DAVID L. LADD
Commissioner of Patents

USCOMM-DC